Patented June 5, 1951

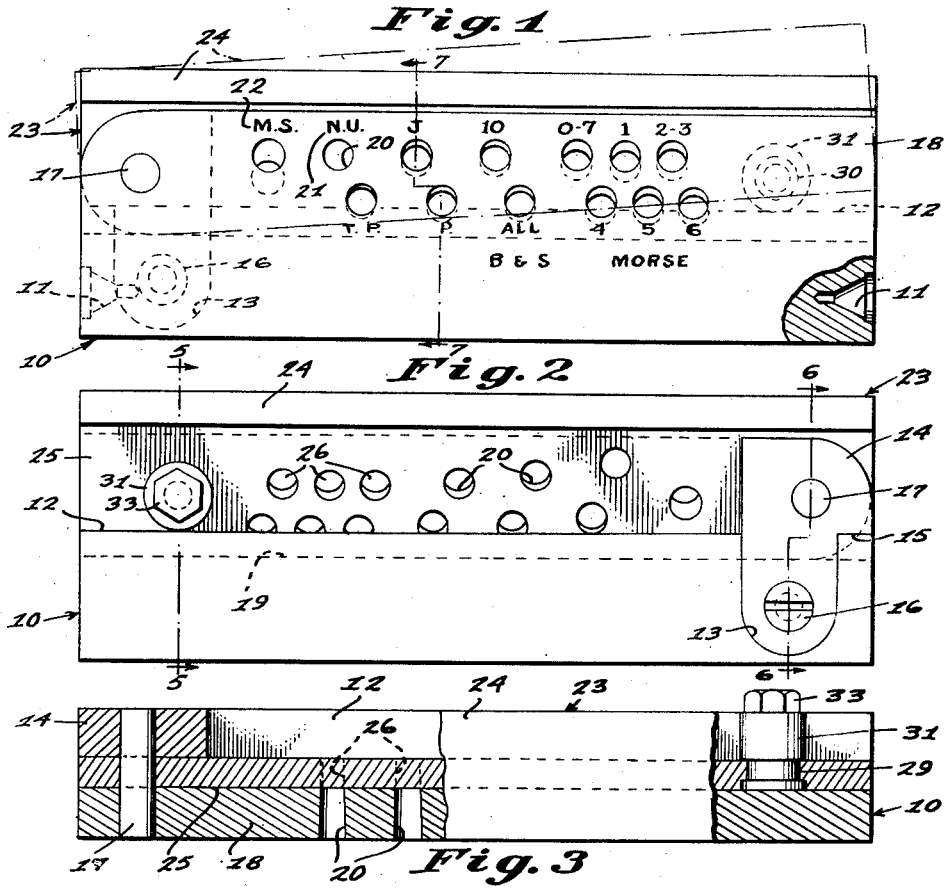
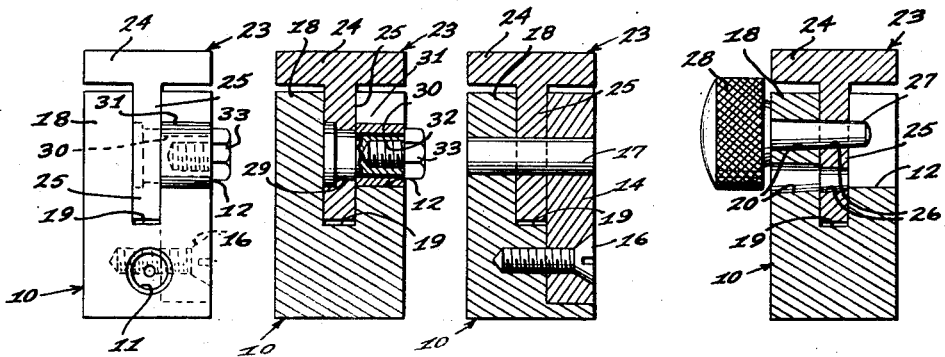

2,555,351

UNITED STATES PATENT OFFICE 2,555,351

GAUGE FOR SETTING TAPER ATTACHMENTS FOR MACHINE TOOLS

Lawrence L. Lowe, Grosse Pointe, Mich.

Application May 18, 1948, Serial No. 27,758

2 Claims. (Cl. 33—174)

Many machine tools include attachments for forming a uniform taper on a work piece. Moreover, such attachments usually include dials, whereby the attachment is theoretically settable to correspond to a desired taper. However, such attachments and dials are not sufficiently accurate where the taper desired must be formed with great accuracy. For instance, the taper attachment on a lathe may be set to the approximate setting by the graduated scale of its dial, but to obtain a fine adjustment necessary for accurate work, frequent readjustments of the attachment must be made through actual trial and error, whereby in the usual and present methods a number of work pieces are usually ruined before the correct taper angle of the attachment is attained.

With the foregoing in view, it is an object of my invention to provide an improved gauge for setting the taper attachments of machine tools.

A further object is to provide an improved gauge for setting a taper attachment of machine tools, which gauge is adjustable to designate an infinite number of taper angles.

A further object is to provide an improved gauge such as that last described wherein means are provided for pre-setting the gauge to a number of pre-selected taper angles.

A further object is to provide an improved gauge for setting the taper attachments of machine tools which includes a base, said base being mountable in operative association with said attachment, a sine bar pivoted to said base, means for setting said sine bar to designate an infinite number of taper angles and provide means for setting said attachment to correspond to the setting of said sine bar.

Other objects and advantages reside in the particular structure of the device, combination and arrangement of the several elements thereof, and will be readily understood by those skilled in the art upon reference to the attached drawing in connection with the following specification, wherein the invention is shown, described and claimed.

In the drawing:

Figure 1 is an elevational view of one side of the gauge according to the invention, parts being broken away and shown in longitudinal vertical section;

Figure 2 is an elevational view showing the opposite side of the gauge of Figure 1;

Figure 3 is a plan view of Figure 1, parts being broken away and shown in horizontal section;

Figure 4 is an end elevation looking from the right of Figure 1;

Figure 5 is a transverse vertical sectional view taken substantially on the plane of the line 5—5 of Figure 2;

Figure 6 is a transverse vertical sectional view taken substantially on the planes of the line 6—6 of Figure 2;

Figure 7 is a transverse vertical sectional view taken substantially on the plane of the line 7—7 of Figure 1, and showing means applied to the gauge for locking the same in a predetermined position.

The gauge according to the present invention comprises a substantially rectangular block or base 10, the opposite ends of which are formed with aligned conical recesses 11, whereby the base may be readily mounted between the centers of a lathe. An upper side portion of the block 10 is cut away to provide a level surface parallel to the bottom of the block and comprising an anvil 12. The same side of the base 10 is recessed adjacent one end to provide a seat 13 for a hinge plate 14. The hinge plate 14 seats in the recess 13 so that the outer surface thereof is flush with the corresponding side surface of the base 10. The hinge plate 14 likewise includes a longitudinally-directed shoulder 15 which seats atop an end portion of the anvil 12. Any suitable means, such as the screw 16, is extended through the hinge plate 14 into the base 10 to secure the hinge plate in place. A hinge pin 17 is extended through that portion of the hinge plate above the anvil 12 and likewise through the flange 18 provided by the side of the base removed from the anvil. A longitudinally-extending groove 19 is formed in the base 10 between the anvil 12 and the rear flange 18 aforesaid.

The flange 18 is formed with a plurality of holes 20 extending laterally therethrough in spaced relation to each other. As shown, the holes 20 may provide an upper and lower series. Likewise, the holes 20 are preferably tapered, whereby the holes are gradually reduced in diameter from the outside of the flange 18 to the inside thereof. The holes 20 are of the same size and of a uniform taper. Each of the holes is designated by suitable indicia, as shown, to designate certain standard tapers or the like, as will be apparent later. Thus, the indicia NU-21 designates a neutral position of the gauge. Likewise, the indicia MS-22 designates a milling machine standard taper.

The gauge according to the invention includes an elongated sine bar 23 which is substantially T-shaped in cross-section to provide a substantially horizontally-disposed runner 24 and a leg 25. The sine bar 23 is coextensive in length with the base 10 and the runner 24 is coextensive in width with the base 10. The leg 25 of the sine bar is journaled on the hinge pin 17 aforesaid. Likewise, the leg 25 of the sine bar is substantially complementary to the groove 19 formed in the base 10 and the lower portions of the leg are seated in said groove, but do not seat against the floor of such groove. Likewise, although the under surfaces of the runner 24 overlie the upper edge of the flange 18, they are not intended to abut thereagainst. The leg of the sine bar is provided with a plurality of spaced apertures 26 extending laterally therethrough, and it should be noted that one aperture 26 is adapted to be aligned with a single one of the apertures 20 formed in the flange 18. The apertures 26 are likewise preferably tapered, whereby they provide when aligned with a corresponding aperture 20 a single aperture which is correspondingly tapered throughout its length for a purpose to be apparent later. Although the apertures 20 in the flange 18 may comprise upper and lower horizontally-aligned rows of apertures, it should be noted that the apertures 26 are not in alignment either horizontally or vertically, whereby but a single one of such apertures 26 may be aligned with but a single aperture 20. Referring now to Figure 7, there is provided a tapered pin 27 which is complementary to the taper of the apertures 20 and 26, whereby when the same is inserted therein, the sine bar 23 is locked in angular relation to the anvil 12 and designates a predetermined taper angle. The pin 27 may be provided with a head 28 to facilitate removal and insertion of the pin in aligned apertures. By providing a tapered set of apertures, and a tapered pin, the pin may be firmly seated therein against misalignment of the sine bar and anvil and prevents wobbling of the sine bar incident to normal wear.

The apertures 20 in the flange 18 designate a large number of standard tapers, whereby the gauge may be rapidly set when a standard taper corresponding to one of the apertures 20 is to be used. Then, with the base 10 mounted on the machine tool in operative relation to the taper attachment thereof, any suitable gauge may be substituted for the cutting tool and applied to the upper surface of the runner 24 of the sine bar 23. Thereafter, the taper attachment of the tool may be manipulated until perfect alignment of the attachment is achieved relative to the sine bar. Then a tool, a cutting tool, may be substituted for the gauge aforesaid and the gauge according to the invention removed and a work piece substituted therefor. Thus, where the gauge 10 is used with a lathe, the base is mounted between the lathe centers by means of the recesses 11 formed in the ends of the gauge.

While the alignable apertures 20 and 26 take in all or virtually all of standard tapers, it is sometimes necessary to provide a setting which is non-standard and which may be of any angle between zero and 90°. With the foregoing in view, means have been provided for setting the sine bar to designate an infinite number of tapers and such means will now be described. To accomplish this purpose, a pin 29 is countersunk into the leg 25 of the sine bar 23 and adjacent the opposite end from the hinge pin 17. Such pin 29 extends transversely of the leg 25, as is best seen in Figure 5, and includes an extension 30 which is cylindrical in form and which extends laterally outwardly of the leg 25 over the anvil 12. Such extension 30 provides a journal for a roller 31 which is secured in place by means of a cap screw 33 threaded into an axial bore 32 of the extension 30. It is intended that the roller 31 have a close fit on the journal-providing extension 30 and will normally engage the anvil 12 when the sine bar is in the neutral position. Such position occurs when the aperture 20 designated by the indicia 21 is aligned with the corresponding aperture 26 of the sine bar, and this position is shown in Figure 1. With the parts in this position, the pin 27 may be inserted through the aligned apertures to lock the sine bar in the neutral position. When an adjustment is required which is not standard or covered by an aperture 20, it is only necessary to interpose suitable gauge blocks between the roller 31 and the anvil 12 until the sine bar extends from the anvil at the desired taper angle. By providing a cylindrical surface on the extension 30, such as the roller 31, a contact with such gauge block comprises a knife edge contact, whereby an accurate adjustment can be obtained. Likewise, it is within the contemplation of the invention to remove the roller from the journal-providing portion 30 and apply the gauge block directly between the portion 30 and the anvil 12 in some instances.

Thus, while the alignable apertures 20 and 26 comprise means for rapidly pre-setting the gauge to a desired taper, the extension 30 and/or the roller 31 provide means for achieving an infinite number of taper settings.

The device according to the invention has a wide variety of uses in addition to those specified hereinabove. For instance, the device is extremely useful in layout work in the tool, die and pattern-making industries. Moreover, the device may be used for checking and inspecting finished work by reason of the great accuracy thereof. Also, the device according to the invention is useful in the making of templates and in the making of scale models.

While I have shown and described what is now thought to be a preferred embodiment of the invention, it is to be understood that the same is susceptible of other forms and expressions. Consequently, I do not limit myself to the precise structure shown and described hereinabove except as hereinafter claimed.

I claim:

1. A taper attachment setting gauge comprising an elongated base formed on one side thereof with a longitudinally extending anvil and with a linear slot disposed intermediate said anvil and the other side of said base, an elongated sine bar having one end thereof positioned within said slot adjacent one end of said base and pivotally attached to the latter for swinging movement into and out of said slot and toward and away from said anvil to define a plurality of taper angles in conjunction with the latter, and means for securing said sine bar in a taper angle position relative to said anvil, whereby to provide a fixed gauge for setting a taper attachment, said means comprising a first set of uniformly tapered apertures provided in said sine bar, a second set of uniformly tapered apertures provided in said other side of said base, each of said first set of apertures being alignable with a select one of the apertures of said second set upon movement of said sine bar, and a tapered plug extending through the aligned pair of apertures.

2. A taper attachment setting gauge comprising an elongated base formed on one side thereof with a longitudinally extending anvil and with a linear slot disposed intermediate said anvil and the other side of said base, an elongated sine bar having one end thereof positioned within said slot adjacent one end of said base and pivotally attached to the latter for swinging movement into and out of said slot and toward and away from said anvil to define a plurality of taper angles in conjunction with the latter, said sine bar being formed with a lateral extension adjacent the other end thereof overlying said anvil, a roller rotatably supported on said lateral extension with its periphery adapted to rest upon said anvil, said anvil and roller being adapted to have gauge blocks interposed therebetween to set said sine bar with respect to said anvil to define an infinite number of taper angles.

LAWRENCE L. LOWE.

REFERENCES CITED

The following references are of record in the file of this patent:

UNITED STATES PATENTS

| Number | Name | Date |
|---|---|---|
| 1,065,994 | Williams | July 1, 1913 |
| 1,107,789 | Hollandt | Aug. 18, 1914 |
| 1,409,343 | Karasick | Mar. 14, 1922 |
| 1,476,573 | Allen | Dec. 4, 1923 |
| 1,526,305 | Newmaier | Feb. 10, 1925 |
| 2,056,948 | Bensen | Oct. 13, 1936 |
| 2,173,519 | Jones | Sept. 19, 1939 |
| 2,373,641 | Ackerson | Apr. 17, 1945 |
| 2,385,396 | Baum | Sept. 25, 1945 |
| 2,398,121 | Silvermaster | Apr. 9, 1946 |
| 2,429,517 | Knapp | Oct. 21, 1947 |
| 2,443,364 | Vancura | June 15, 1948 |